US008591696B2

(12) United States Patent
Smith

(10) Patent No.: US 8,591,696 B2
(45) Date of Patent: Nov. 26, 2013

(54) METHOD FOR MANUFACTURING A SURFACE ELEMENT

(75) Inventor: Patrick George Smith, Raleigh, NC (US)

(73) Assignee: Pergo (Europe) AB, Trelleborg (SE)

( * ) Notice: Subject to any disclaimer, the term of this patent is extended or adjusted under 35 U.S.C. 154(b) by 34 days.

(21) Appl. No.: 12/948,392

(22) Filed: Nov. 17, 2010

(65) Prior Publication Data

US 2012/0117897 A1 May 17, 2012

(51) Int. Cl.
*C09J 5/02* (2006.01)

(52) U.S. Cl.
USPC ........................................ 156/307.4; 428/206

(58) Field of Classification Search
USPC .............. 52/390, 311.1, 315–316; 156/307.1, 156/307.3, 307.7, 307.4; 428/204, 206
See application file for complete search history.

(56) References Cited

U.S. PATENT DOCUMENTS

| | | | | |
|---|---|---|---|---|
| 3,798,111 | A | 3/1974 | Lane | |
| 4,226,933 | A * | 10/1980 | Ishizawa et al. | 430/320 |
| 4,505,974 | A * | 3/1985 | Hosler | 428/329 |
| 6,106,654 | A * | 8/2000 | Velin et al. | 156/276 |
| 6,375,777 | B1 * | 4/2002 | Sjolin et al. | 156/209 |
| 6,440,538 | B1 * | 8/2002 | Ungar | 428/195.1 |
| 6,536,178 | B1 | 3/2003 | Paalsson et al. | |
| 6,588,166 | B2 | 7/2003 | Martensson et al. | |
| 6,591,568 | B1 | 7/2003 | Paalsson | |
| 6,601,359 | B2 | 8/2003 | Olofsson | |
| 6,729,091 | B1 | 5/2004 | Martensson | |
| 6,761,794 | B2 * | 7/2004 | Mott et al. | 156/277 |
| 6,763,643 | B1 | 7/2004 | Martensson | |
| 6,773,799 | B1 * | 8/2004 | Persson et al. | 428/323 |
| 6,803,110 | B2 * | 10/2004 | Drees et al. | 428/423.7 |
| 6,823,638 | B2 | 11/2004 | Stanchfield | |
| 6,854,235 | B2 | 2/2005 | Martensson | |
| 6,893,713 | B2 * | 5/2005 | Sjoberg et al. | 428/329 |
| 6,920,732 | B2 | 7/2005 | Martensson | |
| 6,949,295 | B2 * | 9/2005 | Clifford | 428/464 |
| 7,003,924 | B2 | 2/2006 | Kettler et al. | |

(Continued)

FOREIGN PATENT DOCUMENTS

| | | | |
|---|---|---|---|
| DE | 696 26 284 | T2 | 10/2003 |
| DE | 10 2008 046 749 | | 3/2010 |

(Continued)

OTHER PUBLICATIONS

German Office Action for Application Serial No. DE 10 2010 055 733.1 dated Nov. 29, 2011.

(Continued)

*Primary Examiner* — William Gilbert
*Assistant Examiner* — Gisele Ford
(74) *Attorney, Agent, or Firm* — Jenkins, Wilson, Taylor & Hunt, P.A.

(57) ABSTRACT

Methods of manufacturing surface elements, such as floor panels, having a wear layer containing hard particles are disclosed, as well as the resulting surface elements. In the manufacturing method, the wear layer is partially manufactured, or may even be purchased as a stock item, before the décor is applied onto the wear layer. Preferably, the décor is applied to the wear layer at a position opposite the intended outer surface of the surface element. Preferably, the décor is printed onto the wear layer on the side of the wear layer intended to be affixed to a supporting core.

9 Claims, 1 Drawing Sheet

(56) References Cited

U.S. PATENT DOCUMENTS

| | | | | |
|---|---|---|---|---|
| 7,040,068 | B2 | 5/2006 | Moriau et al. | |
| 7,060,158 | B2 * | 6/2006 | Sjoberg et al. | 156/307.7 |
| RE39,439 | E | 12/2006 | Pervan | |
| 7,160,610 | B2 * | 1/2007 | Takeuchi et al. | 428/335 |
| 7,527,856 | B2 * | 5/2009 | Thiers et al. | 428/323 |
| 7,721,506 | B2 * | 5/2010 | Bennett et al. | 52/789.1 |
| 7,762,035 | B2 * | 7/2010 | Cappelle | 52/588.1 |
| 7,877,938 | B2 * | 2/2011 | Bennett et al. | 52/177 |
| 7,989,050 | B2 * | 8/2011 | Hasch et al. | 428/172 |
| 8,323,447 | B2 * | 12/2012 | Broberg et al. | 156/307.7 |
| 2002/0117277 | A1 | 8/2002 | Johnson | |
| 2006/0099386 | A1 | 5/2006 | Smith | |
| 2007/0006543 | A1 | 1/2007 | Engstrom | |
| 2009/0019806 | A1 | 1/2009 | Muehlebach | |
| 2009/0064624 | A1 | 3/2009 | Sokol | |
| 2009/0100782 | A1 | 4/2009 | Groeke et al. | |
| 2012/0117897 | A1 | 5/2012 | Smith | |

FOREIGN PATENT DOCUMENTS

| | | |
|---|---|---|
| DE | 10 2010 055 773.1 | 6/2012 |
| EP | 837771 | 4/1998 |
| WO | WO 2005/097380 | 10/2005 |
| WO | WO 2006/043893 | 4/2006 |
| WO | WO 2007/008139 | 1/2007 |
| WO | WO 2008/040760 | 4/2008 |
| WO | WO 2009/139687 | 11/2009 |
| WO | WO 2009/153680 | 12/2009 |
| WO | WO 2010/136171 | 12/2010 |

OTHER PUBLICATIONS

Non-final Office Action for Application Serial No. 12/948,392 dated Apr. 30, 2012.

* cited by examiner

METHOD FOR MANUFACTURING A SURFACE ELEMENT

FIELD OF THE INVENTION

The invention relates to a method for manufacturing a surface element.

DESCRIPTION OF THE RELATED ART

A method for manufacturing a decorative thermosetting laminate is known from EP 0 837 771 B1. A paper web impregnated with melamine-formaldehyde resin is provided for manufacturing an abrasion resistant and scratch resistant surface layer. One side of the paper web is coated with hard particles with an average particle size of 30 to 90 μm, while another side of the paper web, or a second paper web, is coated with hard particles having an average particle size of 1 to 15 μm. After the resin has dried, the paper web, which has been provided with hard particles and impregnated, is placed as a surface layer onto a core layer and bonded thereto. The impregnated paper provided with hard particles can consist of a decorative sheet which bears a pattern or is monochromatic.

Apart from the use of separate paper layers bearing the decorative pattern, the direct application of the decorative pattern onto the core or the wear layer is already known. This makes it possible to save materials costs because the separate layer for decoration can be omitted.

SUMMARY OF THE INVENTION

Based hereon, it is the object of the invention to provide an improved method for manufacturing a wear layer or a surface element. The object on which the invention is based is achieved by a method for manufacturing a wear layer, suitably applicable in a method of manufacturing of a surface element, in particular a flooring panel, with a supporting core, a decorative pattern and, a wear layer, wherein the wear layer is provided with a plurality of hard particles, comprising the following step: applying the decorative pattern onto the wear layer. The inventive method is characterized in that the wear layer already comprises hard particles when the decorative pattern is applied onto the wear layer.

In particular, the method according to the invention is based on the idea that the decorative layer is applied onto an almost finished wear layer. In particular, the wear layer may be procured as a purchased part. Then, a decorative pattern can be applied onto this wear layer as needed or according to individual design preferences, with the known printing methods being suitable, in principle, for applying the decorative pattern. The wear layer itself can be formed by paper layers impregnated with resin and provided with hard particles. The hard particles can be accommodated in the paper web. By such a method, a subsequent simplified process for manufacturing a surface element can be ensured, on the one hand, due to the use of at least almost finished wear layers, particularly as purchased parts. On the other hand, a high degree of flexibility can be made possible with regard to the production of decorative patterns by applying the decoration onto the wear layer. In a subsequent process, it is possible to apply the wear layer directly onto the supporting core.

Preferably, hard particles are applied onto paper layers or paper layers are coated with hard particles. In particular, by applying the hard particles onto the paper layers or coating them with hard particles, surface areas of the paper layers can be specifically reinforced, in particular after the manufacture of the paper layers.

Alternatively, or in combination the wear layer preferably comprises a number of resin-impregnated paper layers, wherein hard particles are introduced into a paper web of one of the paper layers prior to applying the decorative pattern onto the wear layer. In particular, the paper layers can be provided with hard particles during their manufacture. At that time, the hard particles can have penetrated into the paper layers.

On the whole, it can thus be accomplished that an almost finished wear layer is used, onto which the decorative pattern is subsequently applied.

Preferably, the decorative pattern is applied on the side of the wear layer which is intended to face the supporting core. In other words, this means that the decorative pattern can be disposed between the wear layer and the supporting core. The decorative pattern is thus protected by the wear layer. To this end, it is necessary that the wear layer is substantially transparent or at least becomes substantially transparent after further processing steps.

Preferably, the decorative pattern is applied onto the wear layer by flexographic printing, digital printing or transfer printing. These methods are in particular characterized by the fact that no hard items, in particular hard printing rollers, come into direct contact with the wear layer. Particularly if hard particles are provided on the side to be printed in the wear layer, they may otherwise lead to increased wear, in particular on a printing roller. In this case, flexographic printing can be characterized by the fact that a printing roller is used which comprises a soft surface that can be yielding to hard particles in the wear layer. In the case of digital printing or transfer printing, a printing roller is usually completely dispensed with.

The invention refers furthers to a wear layer, manufactured by a method as described above.

The invention refers further to a surface element, in particular a flooring panel, with a supporting core, a decorative pattern and, a wear layer, wherein the wear layer is provided with a plurality of hard particles, comprising the following steps: manufacturing a wear layer according the method as described above, bonding the wear layer to the supporting core.

The invention refers further to a surface element, in particular a flooring panel, with a supporting core, a decorative pattern and, a wear layer, wherein the wear layer is provided with a plurality of hard particles, comprising the following step: bonding a wear layer, which is manufactured by a method as described above.

The decorative pattern can be applied by printing, in particular by direct applying or printing, onto the wear layer.

Preferably, a surface structure is applied to the wear layer, in particular by embossing, engraving or etching, subsequent to the application of the decorative pattern onto the wear layer. The visual and/or tactile impression of the decorative pattern can thus be produced or enhanced. The structure applied preferably matches the decorative pattern applied.

The invention refers further to a surface element which is manufactured as described above.

Surface elements can be configured as flooring elements or flooring panels, particularly floating floor elements which are attached to each other but not the supporting subfloor. The surface elements can have a square or rectangular shape. In this case, the surface elements can be formed from a decorative thermosetting laminate and comprise an abrasion-resistant and/or scratch resistant wear layer. The wear layer can comprise a number of paper layers impregnated with a thermosetting resin. A supporting core can form a mechanically stabilizing layer of the surface element. The supporting core can consist of HDF, MDF, or also of layers of paper web. The wear layer can comprise hard particles which can improve abrasion resistance and/or scratch resistance. The hard particles can be silicon dioxide particles, aluminum dioxide particles or silicon carbide particles. On lateral edges, in particular all lateral edges, the surface element can comprise joining elements, such as groove and tenon, preferably provided with locking elements with which it can be connected, and preferably locked, to adjacent surface elements.

The hard particles can have an average size of 0.1 to 100 μm, preferably 0.1 to 90 μm or 30 to 80 μm in the case of the large hard particles, and preferably 0.1 to 20 μm or 0.1 to 10 μm in the case of the small hard particles. The amount by weight of the hard particles can be 1 to 35 $g/m^2$, preferably 10 to 30 $g/m^2$.

BRIEF DESCRIPTION OF THE DRAWINGS

The invention is explained in more detail below by means of the figures. In the figures.

DETAILED DESCRIPTION OF THE PREFERRED EMBODIMENTS

Figure 1:
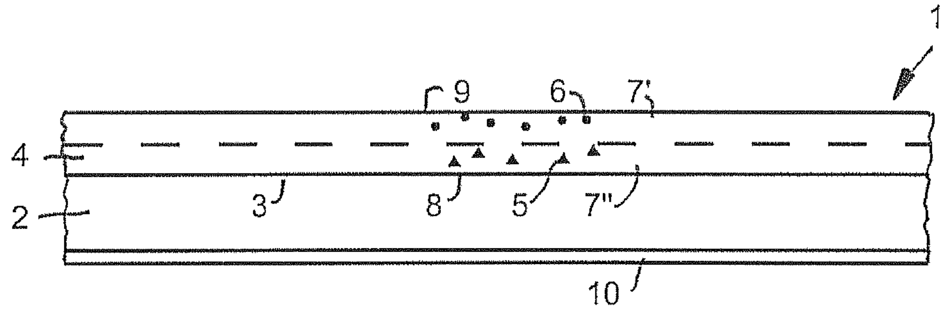
FIG. 1 shows a cross section of a flooring panel according to the invention.
Figure 2:
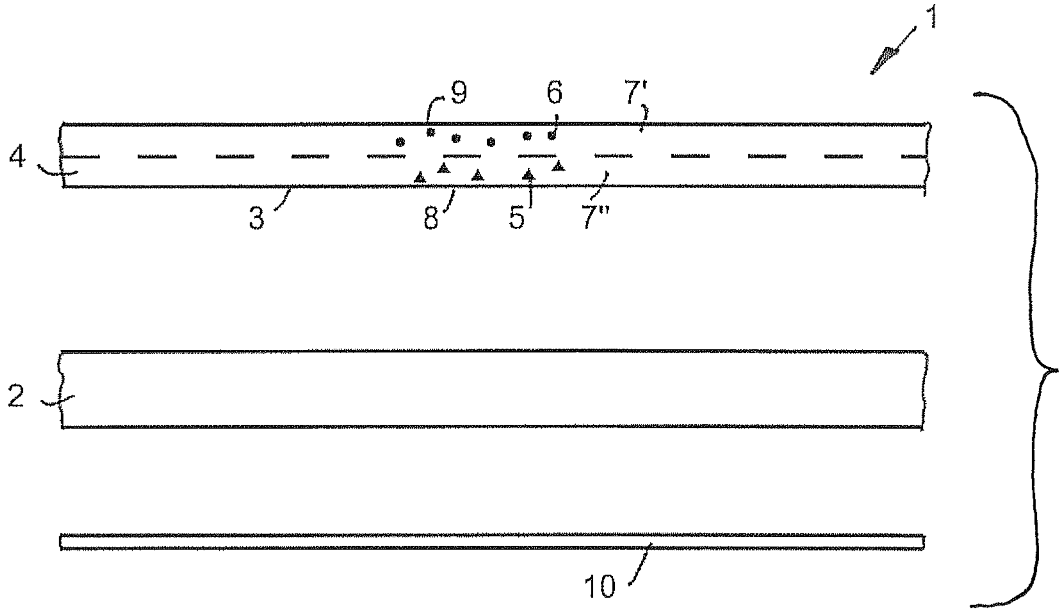
FIG. 2 shows a cross section of the flooring panel according to FIG. 1 with the layers in an exploded view.

FIGS. 1 and 2 are described together below. A flooring panel comprises several layers, namely a supporting core 2 and a counteracting layer 10 attached to the underside of the supporting core. Furthermore, a wear layer 4 is provided on the top side of the supporting core 2. The wear layer 4 comprises an upper paper layer T and a lower paper layer 7", with both paper layers 7 being impregnated with a melamine-formaldehyde resin. Small hard corundum particles with an average diameter of 1 to 15 μm, which increase the scratch resistance of the upper paper layer 7", are provided within the upper paper layer 7'. Large hard corundum particles 5 with an average diameter of 30 to 90 μm, which increase the abrasion resistance of the wear layer 4, are provided within the lower paper layer 7". These hard particles penetrate the respective paper layers. Alternatively or combined, however, the hard particles can also be disposed only on surface areas of the respective paper layers, in particular by subsequent application onto the paper layers.

A decorative pattern 3 is applied onto an underside 8 of the wear layer by printing before the wear layer is bonded to the supporting core. The wear layer 4 is added to the process of manufacturing the flooring panel as a purchased part. In this case, the wear layer 4 already comprises all the paper layers 7 with the hard particles 5, 6. In order to apply the decorative pattern onto the wear layer, a printing method is used in which no hard items, e.g. printing rollers, come into contact with the hard particles, because the hard items would thus be exposed to an increased wear. Therefore, flexographic printing, digital printing and transfer printing are particularly suitable as printing methods. After the decorative pattern 3 has been applied onto the wear layer 4, the wear layer 4 is placed on the supporting core 2 and compressed under the influence of heat and pressure, together with the counteracting layer 10, to form a flooring panel 1. A surface structure, which is not shown and which can improve the visual and tactile impression of the surface of the flooring panel 1, is embossed on the top side 9 of the wear layer 4 by means of appropriate pressing tools.

A floor element according to the present invention is an element which suitably can serve for extensive covering of a floor in buildings, means of transport and the like. A floor element can rest directly on the floor to be covered. A floor element can be layer-built and can comprise one or more of the following layers: a supporting layer of core material which can be formed from wooden material, e.g. wooden fibre material or wood strips; a decorative layer with an optically visible design; a protective wear layer covering the decorative layer which may be transparent; a counteracting layer, which can be placed on the side of the supporting layer facing away from the decorative layer, and can counteract deformation of the floor element; a sound absorbing layer on the lower face. Several floor elements of a floor area are preferably located in a common plane. Lateral edges of the floor elements can have joining means for joining adjacent floor elements to each other. The floor element can be a floor panel.

Suitable core materials may include one or more of wood, particleboard, fibreboard, such as high density fibreboard (HDF) or medium density fibreboard (MDF); polymer (thermosetting and thermoplastic, and in a solid, sheet or corrugated form) and especially phenolic laminate; flax board, stone (e.g., ceramic, marble, slate), cardboard, concrete, gypsum, high density fiber reinforced plaster, plywood, oriented strand board, cores made from cellulosic particles (including discrete pieces of wood, which can be veneers, chips, curls, flakes, sawdust, shavings, slivers, stands, wafers, wood flour, wood wool and/or wood fibers) bonded together by an organic or inorganic binder; and other structural materials, such as metals (e.g., brass, aluminum, steel, copper, composites, composites or alloys). In some embodiments, the core material can be foamed (either open cell or closed cell), such as polyurethane. In still further embodiments, the core is made from multiple materials (such as those listed above), either as a heterogeneous mass, multiple layers or defined sections. In some embodiments, it is desirable, e.g., for acoustic, footfall impact or other reasons to include a damping foil of an elastomer arranged between the core and the upper and/or lower decorative surface. Suitable elastomer materials are described in U.S. Pat. No. 6,893,713, the entire disclosure of which is herein conventional by reference. A particularly preferred laminate is made from a core of phenolic resin impregnated papers, otherwise known as compact laminate, onto which each of the upper and lower decorative surfaces is also laminated. A dampening foil or foils may also be included in such an embodiment. The entire compact laminate, including the decorative laminate, and any dampening foils can be made in one step in a EL press. Any of the above materials, such as the core and decorative layers, may also be provided with antistatic or antibacterial properties, e.g., by the inclusion of silver flakes, powders or particles, organic antibacterial compounds, carbon black, ceramics, or other metals or alloys. Preferred plastics include extrudable and/or moldable thermosetting and thermoplastic resins, the latter including high density olefins and polyvinylchloride, and the former including phenolics, such as phenol-formaldehyde and UV or radiation curable resins, such as melamine based resins, e.g., melamine formaldehyde.

The resulting products typically have a durability rating. As defined by the European Producers of Laminate Flooring, such products can have an abrasion resistance rating of anywhere from AC1 to AC6. Typical abrasion resistances are >300 cycles, >400 cycles, >500 cycles, at least 900 cycles, at least 1500 cycles (AC2), at least 2000 cycles (AC3), at least 4000 cycles (AC4), at least 6500 cycles (AC5) and at least 8500 cycles (AC6), as measured by European Standard EN 13329 (Annex E). Typical products according to the invention can also have impact resistance ratings of IC1, IC2, IC3, or IC4, as measured by European Standard EN 13329.

Moreover, it is possible to provide the decor with a texture which enhances the pattern of the underlying paper sheet. Such texturing can be created to be "in register" with, offset from, or to contrast with the image of the paper sheet. The texture can be selected by the installer to enhance (e.g., match or contrast with) any texture of adjacent or included surfaces. The texture may also be provided on the decor such that features of the texture extend from a flooring element onto and possible completely across the adjacent flooring elements, which texture may, or may not coincide with the underlying decor. Features of the pattern based on stone or wood may include grains, veins, cracks and/or knots, and those of animation and/or fantasy may include details of the faces, such as wrinkled skin, frown marks, details of the eyes, ears, mouth, teeth, hands, fingers, etc. of the animation and/or fantasy patterns.

Although rectangular (e.g., square) panels are preferred, the panels can independently be of any regular or irregular geometric shape, e.g., octagonal, hexagonal, triangular; see those shown in U.S. Pat. Nos. 6,823,638; 6,854,235; 6,588,166; 6,920,732; 6,763,643; RE39,439; 6,536,178; 6,591,568; 6,601,359; 7,040,068; 7,003,924; U.S. Patent Publication Nos. 2007/0006543 A1; 2006/0099386A1 or International Publication No. WO 2006/043893, each incorporated in its entirety by reference. If the panels are all of the same shape, the dimensions need not be the same, as for example, rectangular panels of varying lengths/widths may be used. When the panels are all rectangular (with one set of long sides and one set of short sides), the long sides are usually joined by relative horizontal movement, but can be joined by relative rotational movement or relative vertical movement or a fold down movement, such as shown in the disclosure of the aforementioned WO 2006/043893 and U.S. Pat. Nos. 6,854,235 and 6,763,643 and U.S. Patent Publication No. 2007/0006543, especially the drawings thereof. Such relative horizontal movement can be a sliding motion along a side, joining only one entire side at once, or joining multiple sides at once, as shown in FIGS. 4-7 of U.S. Pat. No. 6,823,638. The short sides of such panels can also, but need not, be assembled by relative horizontal movement and may lock. The joints can include a slideable or deformable element, or in an alternative, a static element to hold the panels together once assembled, such as shown in the aforementioned WO 2006/043893 publication, and U.S. Pat. Nos. 6,920,732; 6,763,643; 6,729,091; and Patent Publication No. US 2007/0006543 A1.

LIST OF REFERENCE NUMERALS

1 Flooring panel
2 Supporting core
3 Decorative pattern
4 Wear layer

5 Large hard particles
6 Small hard particles
7 Paper layer
8 Underside of the wear layer
9 Top side of the wear layer
10 Counteracting layer

I claim:

1. Method for manufacturing a surface element, comprising:

providing a wear layer comprising a paper layer and a plurality of hard particles, wherein the paper layer is manufactured and thereafter the plurality of hard particles are applied to a surface of the paper layer;

applying a decorative pattern onto the wear layer, wherein the decorative pattern is applied to the surface of the paper layer to which the hard particles were applied, wherein the decorative pattern is applied by flexographic printing, digital printing or transfer printing;

impregnating the paper layer with resin;

providing a supporting core; and applying the wear layer to the supporting core, wherein wear layer is applied to the supporting core such that the surface of the paper layer to which the hard particles and decorative pattern were applied faces the supporting core.

2. Method according to claim 1, characterized in that the wear layer comprises a number of resin-impregnated paper layers, wherein the hard particles are introduced into a paper web of one of the paper layers prior to applying the decorative pattern onto the wear layer.

3. Method according to claim 1, wherein applying the wear layer to the supporting core comprises directly applying the wear layer onto the supporting core.

4. Method according to claim 1, characterized in that a surface structure is applied on the wear layer after the decorative pattern is applied onto the wear layer.

5. Surface element manufactured by a method according to claim 1.

6. Method according to claim 1, wherein the plurality of hard particles applied to the paper layer comprises an amount of hard particles by weight of about 1 gram/meter$^2$ to about 35 grams/meter$^2$.

7. Method according to claim 6, wherein the plurality of hard particles applied to the paper layer comprises an amount of hard particles by weight of about 10 grams/meter$^2$ to about 30 grams/meter$^2$.

8. Method according to claim 1, wherein the plurality of hard particles applied to the paper layer comprise hard particles having an average size of about 0.1 micrometer to about 100 micrometers.

9. Method according to claim 8, wherein the plurality of hard particles applied to the paper layer comprise hard particles having an average size of about 30 micrometers to about 90 micrometers.

* * * * *